(12) United States Patent
Hisada

(10) Patent No.: US 7,851,018 B2
(45) Date of Patent: Dec. 14, 2010

(54) METHOD OF MANUFACTURING OPTICAL INFORMATION RECORDING MEDIUM

(75) Inventor: Kazuya Hisada, Osaka (JP)

(73) Assignee: Panasonic Corporation, Osaka (JP)

( * ) Notice: Subject to any disclaimer, the term of this patent is extended or adjusted under 35 U.S.C. 154(b) by 1225 days.

(21) Appl. No.: 11/028,612

(22) Filed: Jan. 5, 2005

(65) Prior Publication Data

US 2005/0175771 A1 Aug. 11, 2005

(30) Foreign Application Priority Data

Feb. 9, 2004 (JP) .............................. 2004-031756

(51) Int. Cl.
  *B05D 1/32* (2006.01)
  *B05D 1/38* (2006.01)
  *B05D 3/12* (2006.01)
(52) U.S. Cl. .................... 427/240; 427/412.1; 427/425; 427/427.3; 118/52; 118/320; 118/321
(58) Field of Classification Search ................. 427/240, 427/425, 412.1, 427.3; 118/52, 320, 321
See application file for complete search history.

(56) References Cited

U.S. PATENT DOCUMENTS

| | | | | |
|---|---|---|---|---|
| 5,773,083 A | * | 6/1998 | Fischer et al. | ............... 427/240 |
| 5,846,626 A | | 12/1998 | Kashiwagi et al. | |
| 5,912,049 A | * | 6/1999 | Shirley | ........................ 427/240 |
| 5,985,363 A | * | 11/1999 | Shiau et al. | ................. 427/240 |
| 2001/0052320 A1 | * | 12/2001 | Komaki et al. | ............. 118/722 |
| 2002/0037366 A1 | * | 3/2002 | Arioka | ........................ 427/240 |

FOREIGN PATENT DOCUMENTS

JP  10-289489  10/1998
JP  2004-247015  9/2004

* cited by examiner

*Primary Examiner*—Kirsten C Jolley
(74) *Attorney, Agent, or Firm*—Wenderoth, Lind & Ponack, L.L.P.

(57) ABSTRACT

The present invention relates to a method of manufacturing an optical information recording medium, which forms a light-transmitting layer made of a radiation curing resin on a substrate having a signal recording layer, a liquid foundation is formed by coating the radiation curing resin in a first coating step. Next, a radiation curing resin is further coated on the foundation in a second coating step. After this, a curing step is performed. By separating the dropping and spreading of the radiation curing resin into two steps, not only the manufacturing time can be reduced, but also the volume of the used radiation curing resin can be reduced.

11 Claims, 7 Drawing Sheets

Fig. 2
(a)
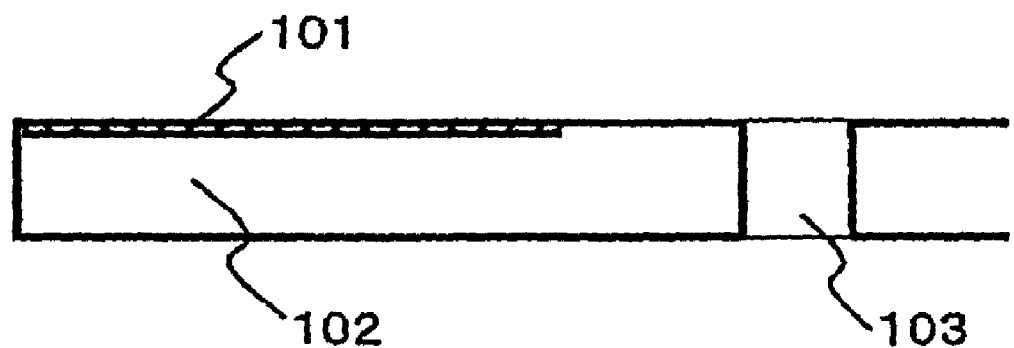
(b)
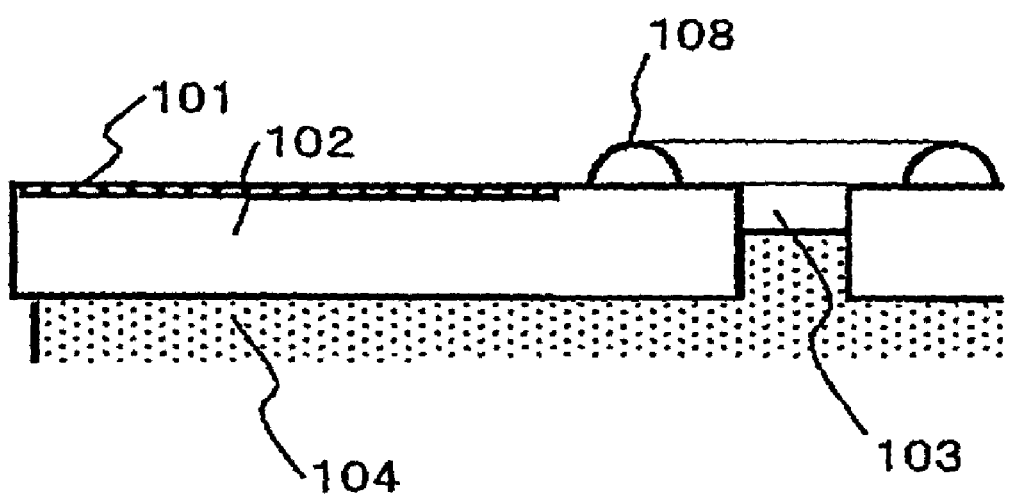

Fig. 3
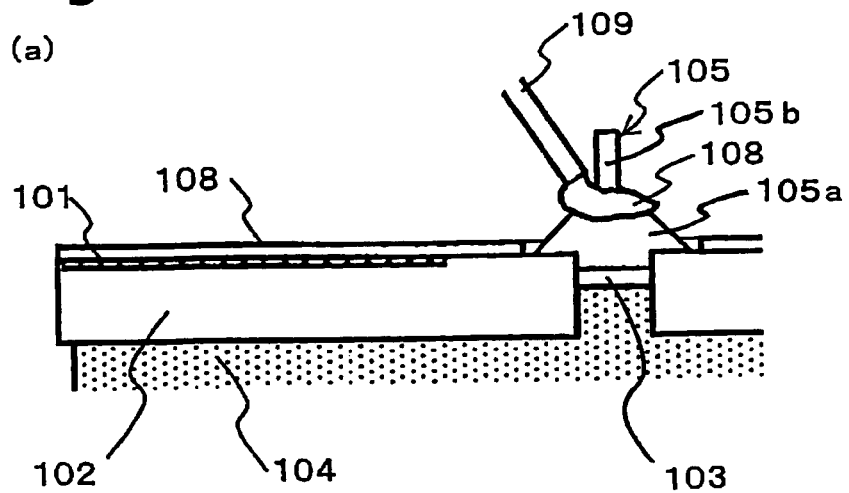
(a)
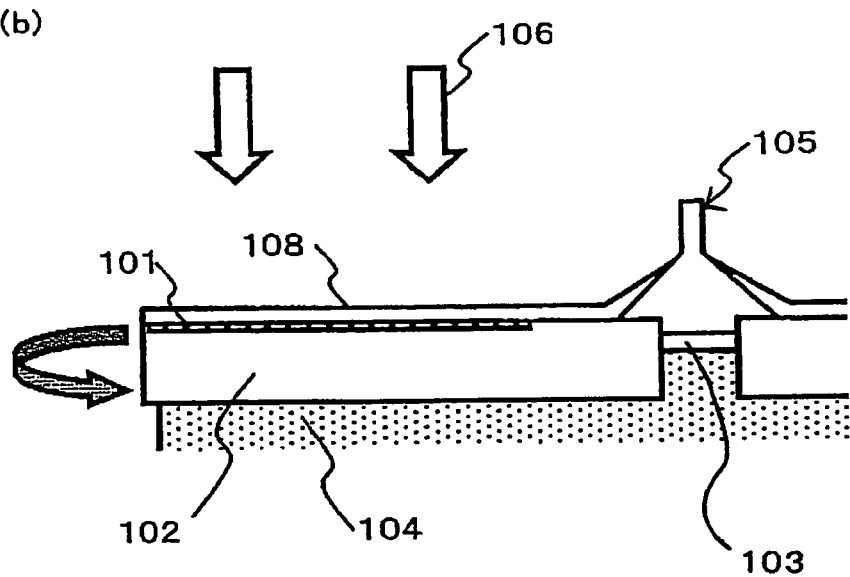
(b)
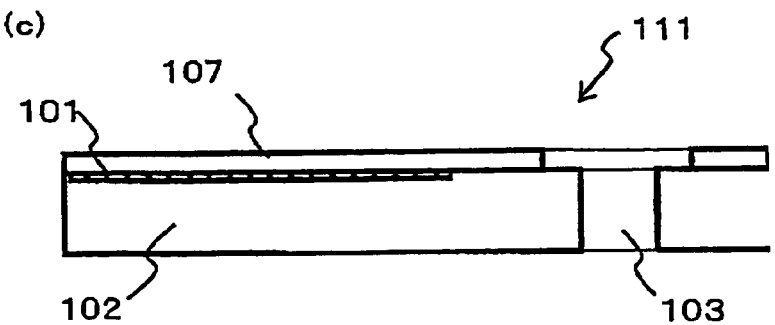
(c)

Fig. 10
(a)
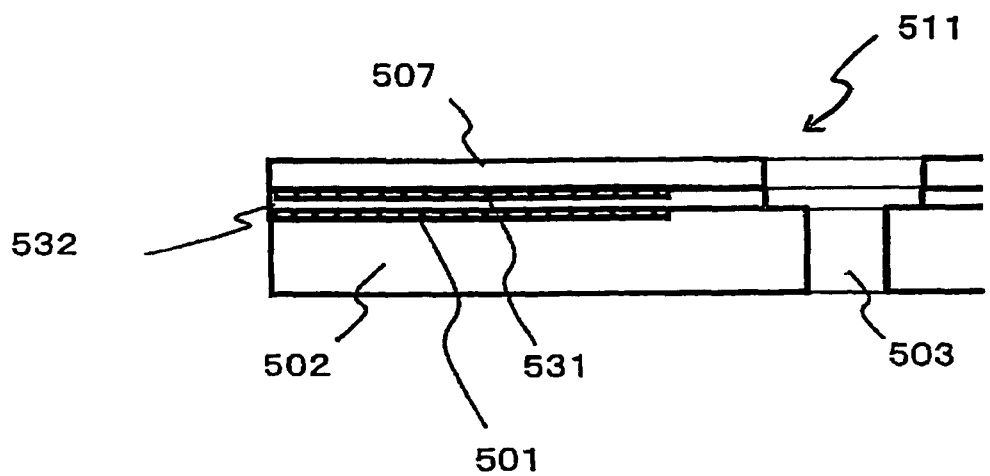
(b)
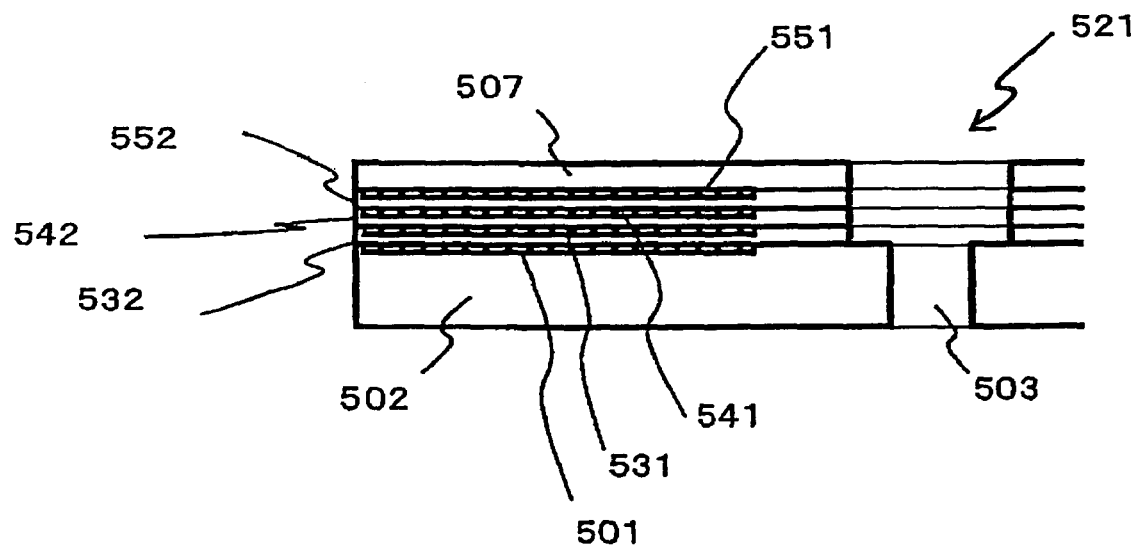

METHOD OF MANUFACTURING OPTICAL INFORMATION RECORDING MEDIUM

BACKGROUND OF THE INVENTION

1. Field of the Invention

The present invention relates to a method of manufacturing an optical information recording medium with high density, for example, with a light-transmitting layer thereof made to be thin.

2. Description of the Prior Art

Recently, research relating to various types of optical information recording has been studied in the optical information recording field. Optical information recording methods have been emerging which are applicable to a range of uses, because these methods can allow media to have higher density, can record/reproduce information by a non-contact method, and can also achieve these objectives at a low price. Currently, an optical disc has a structure produced, for example, by forming an information layer on a transparent resin layer with a thickness of 1.2 mm, and then covering and protecting the layer with an over coating (which is compact disc (CD)), or by forming information layers on one or both sides of a transparent resin layer with an over coating, or by forming information layers on one or both sides of a transparent resin layer with a thickness of 0.6 mm, and then laminating two of the information layers (which is Digital Versatile Disc (DVD)).

Recently, as a way to increase the recording density of optical discs, methods have been studied such as increasing the numerical aperture (NA) of an objective lens, and shortening the wavelength of the laser. In these methods, if the thickness of a recording/reproducing base material (which is a substrate of the side on which an optical laser is incident) is thin, the influence of an aberration of the laser spot decreases, and allowance for a gradient angle (tilt) of the disc increases. From this, an idea was proposed to set the thickness of the recording/reproducing base material to be around 0.1 mm, NA to be around 0.85, and the wavelength of a laser to be around 400 nm (see Japanese unexamined patent publication H08-235638, for example). Here, because of effects on the focus of the recording/reproducing light and risk of spherical aberration, it is preferable that the thickness variation of the recording/reproducing base material is reduced to be within 5%. Even in an optical disc having such reduced thickness variation, in which the recording/reproducing base material has thickness is 0.1 mm, the thickness of the disc is preferably 1.2 mm like a conventional CD or DVD, because the disc should have compatibility with existing hardware.

Such a base material (which is a light-transmitting layer) on the recording/reproducing side of Blu-ray discs can not be formed by injection molding which has been conventionally used for producing optical discs, because the material is as thin as approximately 0.1 mm. Generally, when the substrate has a diameter of approximately 12 cm and its thickness of is less than 0.3 mm, using the injection molding becomes an extremely difficult task. In addition, the base material of the recording/reproducing side needs to satisfy extremely high thickness accuracy. These were reasons why the following method has been mainstream: a sheet which is produced by a method like a casting is punched out in a disc shape, and then glued together with the substrate. However, with this method, the cost of the sheet material becomes really expensive, thus the optical disc becomes expensive. Therefore, in order to form the base material of the recording/reproducing side, a method as follows has been proposed: coating a radiation curing resin by a spin coating or the like, and then curing the resin (see Japanese unexamined patent publication H 10-289489, for example).

When a spin coating method is used to form a base material of the recording/reproducing side, the base material is required to have extremely high thickness accuracy. Thus, the spin coating also requires high technology, and so the manufacturing time becomes extremely long. More specifically, the reasons are as follows. When forming a base material of the recording/reproducing side made of a radiation curing resin on a substrate, because both a reflection film and a recording film are formed on the same side of the substrate, friction of the radiation curing resin may change over the disc area. Therefore, to form a thick film such as having a thickness of 100 µm by only one coating step, spreading must be performed at the low rotation speed. In addition, because the radiation curing resin is prevented from spreading out in areas having higher friction, the resin does not spread in a circular pattern, and the thickness of the light-transmitting layer easily becomes uneven. Therefore, to obtain the desired thickness accuracy, the spreading time during the coating step inevitably lengthens.

As mentioned above, if the manufacturing time lengthens, the mass production of a medium is not feasible as long as the production line increases, and this involves enormous cost for investment in facilities. In addition, the big problem is, even if the material cost becomes low, the production cost does not.

SUMMARY OF THE INVENTION

The object of the present invention is, in a method of manufacturing an optical information recording medium, to reduce manufacturing time when producing a light-transmitting layer made of liquid materials such as a radiation curing resin.

To solve the problems mentioned above, a method of manufacturing an optical information recording medium of the present invention having a substrate which includes at least one signal recording layer and a light-transmitting layer which is made of a radiation curing resin formed on the substrate, comprises, a first coating step for coating a radiation curing resin and forming a liquid state foundation, and a second coating step for further coating a radiation curing resin on the liquid state foundation. Thus, when the light-transmitting layer is formed by spin coating, the manufacturing time and furthermore, volume of used radiation curing resin can be drastically reduced.

After the second coating step, it is preferable that the method further comprises a curing step.

Thus, a light-transmitting layer with uniform thickness can be formed.

The curing step is preferably performed by applying radiation while rotating the optical information recording medium. Thus, the light-transmitting layer with uniform thickness up to a radially outermost circumference of the substrate can be formed.

In addition, each step preferably includes a spin coating, and a maximum rotation number during the spin coating of the first coating step is preferably larger than that of the second coating step. Thus, the time for the first coating step can be reduced, and this results in the reduction of the manufacturing time of the optical information recording medium.

Furthermore, the rotation time for the spin coating of the first coating step is preferably shorter than that of the second coating step. Thus, the time for the first coating step can be reduced, and this results in the reduction of the manufacturing time of the optical information recording medium.

A nozzle for dropping the radiation curing resin preferably inclines from the vertical position. Thus, the radiation curing resin can be dropped uniformly and in an almost circular pattern.

In addition, the first coating step may include a blasting method. Thus, the time for the first coating step can also be reduced.

In the second coating step, a center hole of the substrate is preferably covered. Thus, the radiation curing resin can be dropped at the center of the substrate, and the light-transmitting layer having uniform thickness can be easily formed.

In addition, a step for transferring the substrate can also be included between the first coating step and the second coating step, or between the second coating step and the curing step.

Furthermore, a protection layer is preferably formed on the light-transmitting layer, and has a pencil hardness of H or more. Thus, the recording/reproducing side of the optical information recording medium can not be easily scratched and reliability of the medium can improve.

According to the method of manufacturing an optical information recording medium of the present invention, manufacturing time can be reduced when producing a light-transmitting layer made of liquid materials such as a radiation curing resin.

BRIEF DESCRIPTION OF THE DRAWINGS

FIG. 2 is cross-sectional diagrams showing examples of a method of manufacturing an optical information recording medium of Embodiment 1 of the present invention.

FIG. 3 is cross-sectional diagrams showing examples of a method of manufacturing an optical information recording medium of Embodiment 1 of the present invention.

FIG. 10 is cross-sectional diagrams showing examples of a method of manufacturing an optical information recording medium of Embodiment 3 of the present invention.

DESCRIPTION OF THE INVENTION

Figure 1:
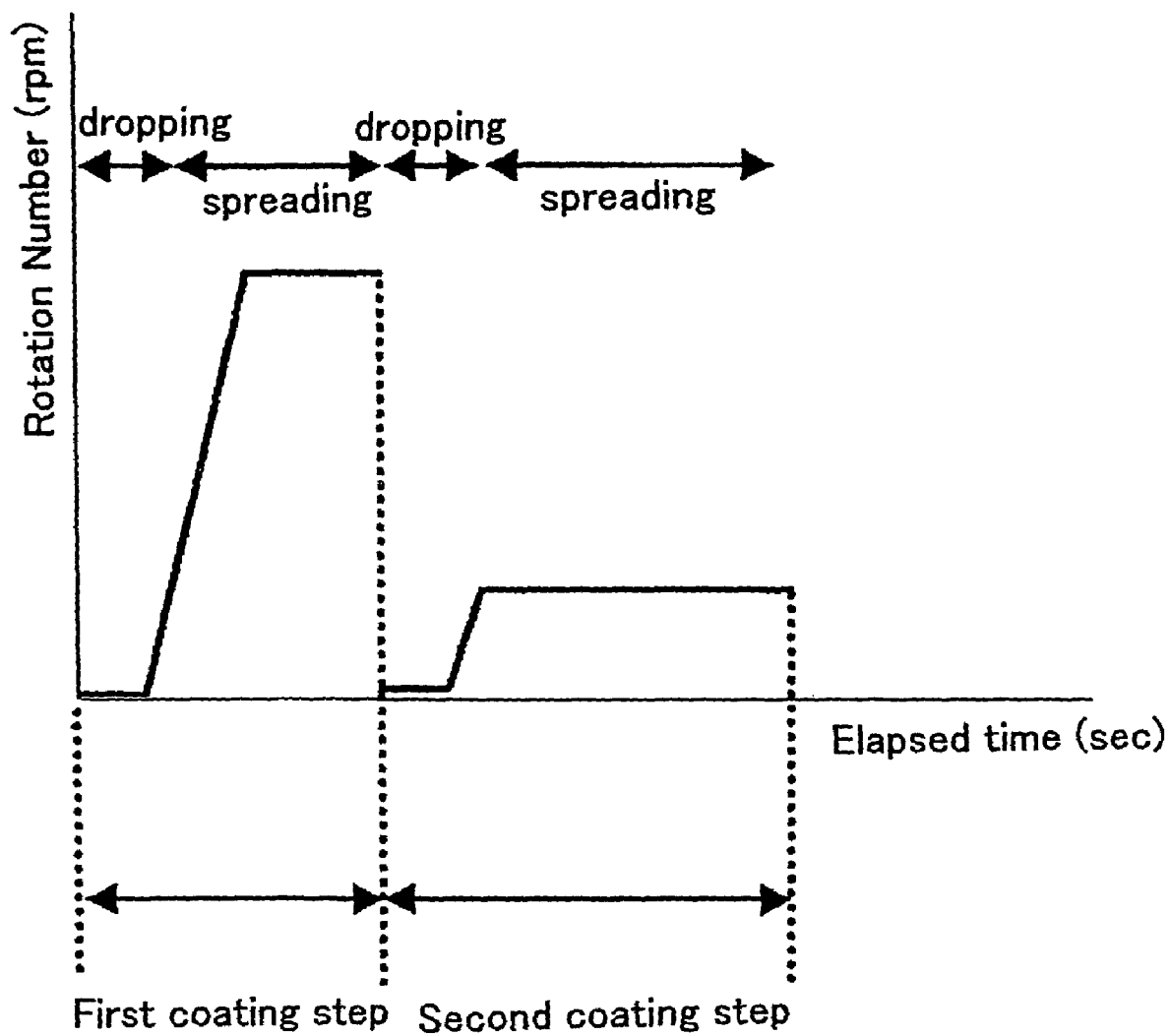
FIG. 1 is a time chart showing an example of a method of manufacturing an optical information recording medium of the present invention.

A method of manufacturing an optical information recording medium of the present invention having a substrate which includes at least one signal recording layer and a light-transmitting layer which is made of a radiation curing resin formed on the substrate, comprises, a first coating step and a second coating step. In the first coating step, by coating (which is dropping and spreading) the radiation curing resin, a liquid foundation is formed. In the second coating step, a radiation curing resin is further coated on the liquid foundation. In FIG. 1, a time chart shows the relationship between the elapsed time of each step and rotation number in the method of manufacturing an optical information recording medium of the present invention. As is clear from FIG. 1, compared to the second coating step, spreading or rotating time is shorter in the first coating step. Thus, the whole time of the coating step becomes short. In addition, during the spreading of the first coating step, the rotation number (which is the maximum rotation number) becomes large compared to the spreading of the second coating step.

Here, because a thin foundation is formed in the first coating step beforehand, a high amount of friction caused when the radiation curing resin flows can be prevented in the second coating step. Therefore, in the second coating step, the radiation curing resin spreads in a circular pattern and forms a thick film having a uniform thickness. From the result, the whole spreading time can be greatly reduced, thus the manufacturing time can also be greatly reduced. Moreover, volume of the used radiation curing resin can be reduced drastically. Furthermore, because the radiation curing resin spreads out swiftly by a high-speed rotation in the first coating step, even if minute foreign substances are on the substrate, they can be removed away from the substrate.

Embodiment 1

Hereinafter, an embodiment of the method of manufacturing an optical information recording medium of the present invention will be explained by referring to the figures. These figures are shown by way of cross-section unless otherwise specified. If the figures are symmetric, then only a portion from the axis of symmetry is shown, and the rest of the figure is omitted.

In FIG. 2(a), a structure of a substrate 102 is shown. The substrate 102 has a signal recording layer 101. Furthermore, in the body of the substrate 102, a center hole 103 is formed. The substrate 102 is made of polycarbonate and formed by injection molding. The substrate 102 may be resin materials other than polycarbonate, for example, acrylate or polyolefin. The substrate 102 has a thickness of approximately 1.1 mm, a diameter of approximately 120 mm, and the center hole 103 with a diameter of approximately 15 mm. In addition, the signal recording layer 101 is formed with a guide groove, or pits and lands, both of which are formed on the substrate 102. And a recording layer, in which a plurality of layers is stacked, is formed thereon.

As shown in FIG. 2(b), the substrate 102 is set on the rotating table 104, and a radiation curing resin 108 of approximately 1.3 g having viscosity of approximately 2000 mPa·s is dropped in a circular pattern. Then, the substrate 102 is rotated by approximately 5000 rpm and spread for approximately 2 seconds (hereinafter, this step of dropping and spreading is referred to as a first coating step).

After the first coating step, the center hole 103 is covered with a cap 105 as shown in FIG. 3(a). Approximately 1.3 g of the same radiation curing resin 108 in the first coating step is dropped on the cap, and spread for approximately 9 seconds at approximately 1300 rpm (hereinafter, this step of dropping and spreading is referred to as a second coating step). To easily install/remove the cap 105, an axis 105b is placed vertically above from a center of the cap body 105a. By dropping the radiation curing resin 108 so as to not adhere to the axis 105b, the cap 105 can be easily removed. In a situation in which substrates are glued together for DVD or the like, the nozzle for dropping the radiation curing resin generally opens in a vertical direction. However, the nozzle 109 preferably inclines from the vertical position in order to drop the radiation curing resin at the base of the axis 105b, which is the center of the cap 105. When an angle between the direction of dropping the radiation curing resin and the vertical direction is 5 to 45 degrees, air bubbles do not become mixed in and the resin can be dropped uniformly in an almost circular pattern. Furthermore, the nozzle 109 preferably inclines toward a direction of the center hole 103 of the substrate 102. Thus, the radiation curing resin can be dropped more easily, and can be formed uniformly in a circular pattern. As described above, a dropping position of the radiation curing resin 108 of the second coating step is different from that of the radiation curing resin 108 of the first coating step. Therefore, in each coating step, the most suitable spin coating is performed.

Figure 4:
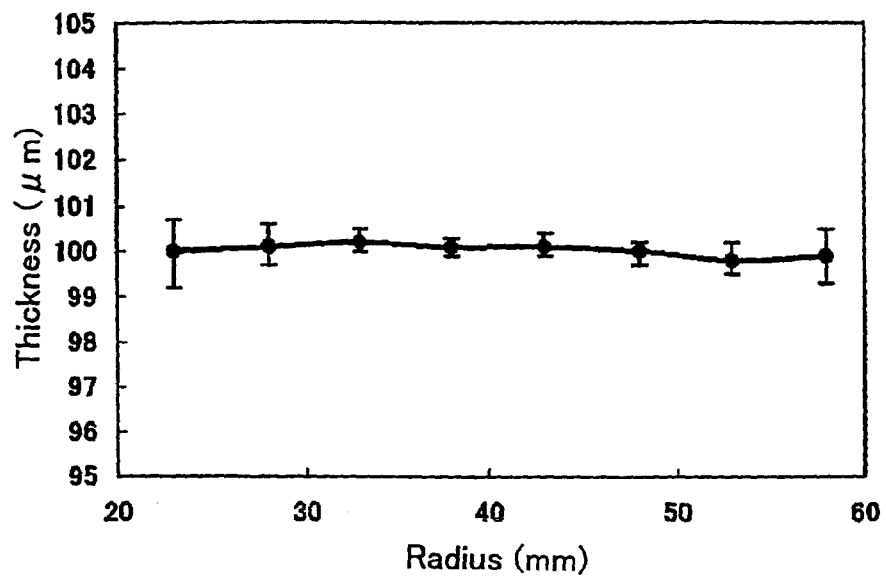
FIG. 4 is a graph showing thickness variations of a light-transmitting layer of an optical information recording medium of Embodiment 1 of the present invention.

After the second coating step, as shown in FIG. 3(b), radiation 106 is applied to the substrate 102 with a rotation speed of approximately 1000 rpm, and then the radiation curing resin 108 is cured (hereinafter, this step is referred to as a curing step). In FIG. 3(c), an information recording medium 111 is shown, which has a light-transmitting layer 107 formed by curing the radiation curing resin 108. By hardening the radiation curing resin with rotation, centrifugal force eliminates a lump of the radiation curing resin formed at the radially outermost circumference of the substrate by surface tension. Then, the light-transmitting layer having uniform thickness over the whole area can be formed. If the curing time is long, the spreading conditions of the radiation curing resin toward the outer circumference become different at curing areas and at non-curing areas. Thus, in order to avoid the variation of thickness of the light-transmitting layer, the curing is preferably performed as quickly as possible. Here, the inventors used equipment (RC-747 by XENON Corp.) including a xenon light source with high-power, which is available for applying high-power pulses. In the present embodiment, the radiation curing resin becomes hard when applying a high-power UV light for approximately 50 ms. In FIG. 4, thickness variations of a radial direction of the obtained light-transmitting layer 107 are shown. A medium having the following accuracies is obtained, such as: an average thickness of the whole area of the disc is approximately 100 μm; and the thickness variation is 2 μm or less. The thickness of the light-transmitting layer is preferably 300 μm or less.

The light-transmitting layer preferably substantially transmits a recording/reproducing laser light. In the optical information recording medium of the present embodiment, recording/reproducing is performed using a laser with a wavelength of approximately 405 nm, and a transmission rate against the wavelength is 90% or more.

Figure 5:
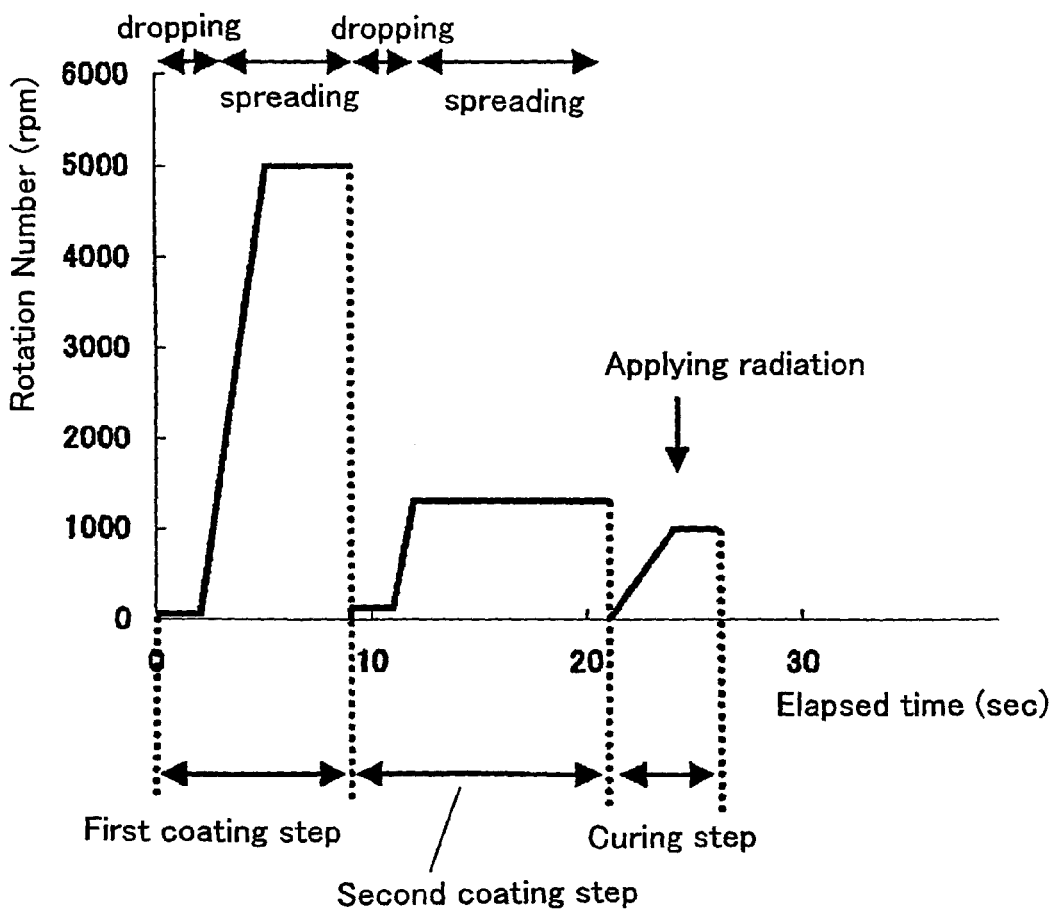
FIG. 5 is a time chart showing an example of a method of manufacturing an optical information recording medium of Embodiment 1 of the present invention.
Figure 6:
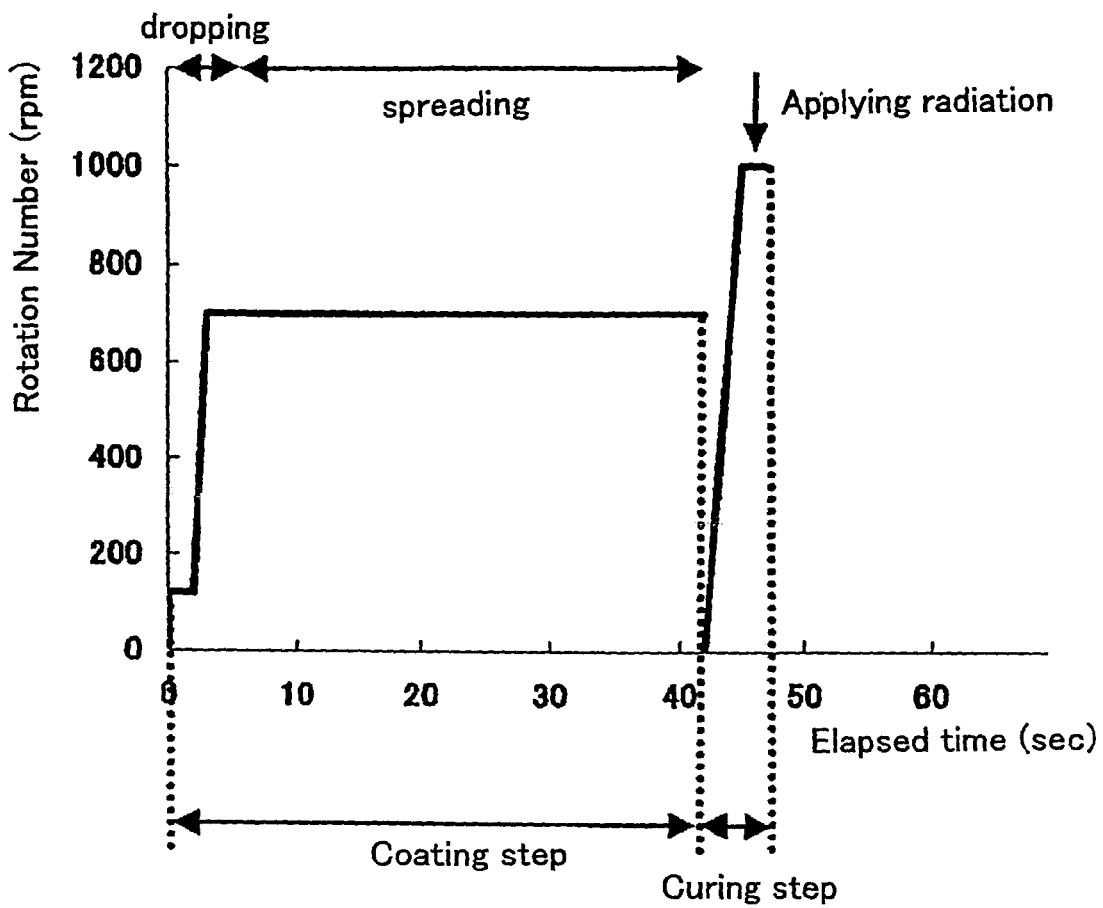
FIG. 6 is a time chart showing a conventional method of manufacturing an optical information recording medium.

In FIG. 5, a time chart of a method of manufacturing an optical information recording medium of the present embodiment is shown. When the coating step is separated into two stages, the first coating step and the second coating step, the spreading took approximately 12 seconds and drop volume of the radiation curing resin was approximately 2.6 g. In FIG. 6, a time chart of forming the light-transmitting layer through only one coating step is shown, where the light-transmitting layer has approximately the same thickness accuracy as above (which was 2 μm). In this situation, required conditions are as follows: a rotation number of approximately 700 rpm; spreading time of approximately 40 seconds; and drop volume of the radiation curing resin of approximately 3.3 g. From the results, by separating the coating into two steps, the manufacturing time can be drastically reduced, and volume of the used radiation curing resin can also be decreased.

This improvement is due to the liquid thin film of the radiation curing resin being formed on the whole area of the substrate and the signal recording layer during the first step, so that the radiation curing resin can be easily and uniformly spread out during the spreading of the second step. When the parameters of the rotation number and the rotating time are changed and the thickness of the thin film is changed in the range of 20- 100 μm during the first coating step, the light-transmitting layer having the uniform thickness forms. Here, all conditions of the second coating step and the curing step are the same as above. In other words, the object of the first step is to form the thin film made of the radiation curing resin, and the thickness of the thin film does not affect the forming step of the light-transmitting layer. Thus, the coating conditions of the first coating step can be chosen arbitrarily as long as almost all areas of the substrate and the signal recording layer are coated. To reduce the manufacturing time, the spreading is preferably performed at as large a rotation number as possible, and almost all the areas of the substrate and the signal recording layer are preferably coated in as short a time as possible. Regarding the volume of the dropped radiation curing resin, it is preferable to choose the bare minimum volume to coat almost all the areas.

Note that, "radiation" here includes all electromagnetic waves which can harden radiation curing resin, for example infrared rays, visible rays, ultraviolet rays, X rays and the like.

In the present embodiment, although the center hole of the substrate is covered with the cap from the second step, the hole may be covered in the first step. In this regard, during the first step, the radiation curing resin may be dropped on the substrate in a circular pattern as described above, or may be dropped on the cap.

After the second coating step and before the curing step, it is also possible to take away the cap covering the center hole. By preventing the radiation curing resin on the cap from curing, the cap can be used repeatedly.

Figure 7:
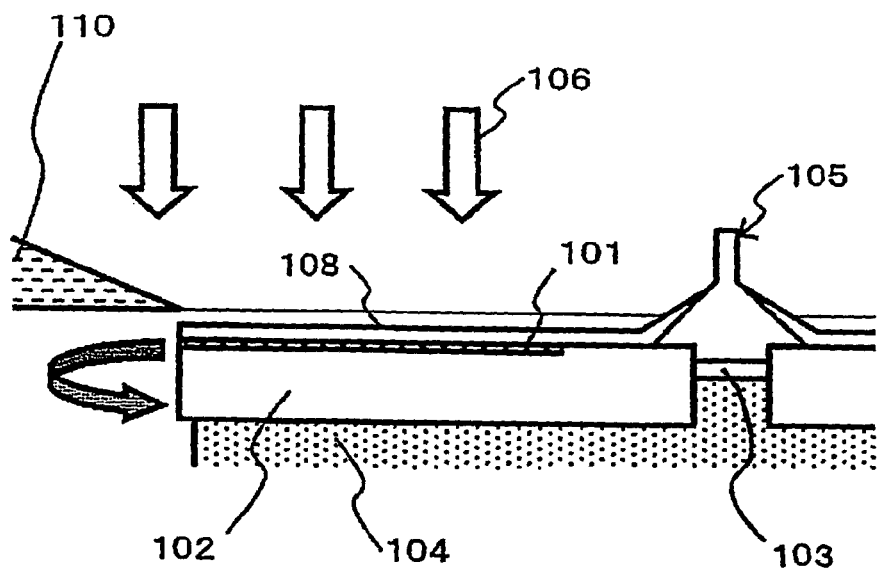
FIG. 7 is cross-sectional diagrams showing examples of a method of manufacturing an optical information recording medium of Embodiment 1 of the present invention.

When applying radiation, the radiation is preferably not applied to the radially outermost circumference of the substrate and the radiation curing resin thrown off from the substrate. Thus, the thrown radiation curing resin can be retrieved and reused by adding another step such as a filtering. As shown in FIG. 7, by placing a light shielding mask 110 while applying the radiation, which has approximately the same outer diameter of the substrate 102, the radiation can be applied almost entirely to the substrate 102.

In this embodiment, an example of a recording/reproducing type or rewriteable optical disc is described. In addition, the present invention may be applied to a write-once type disc which can record only once and a read-only type optical disc having Al or Ag as main components in the reflective layer.

Furthermore, an example of the manufacturing method which separates the coating step into two steps is shown; however, the step may be separated into three or more steps as long as the manufacturing time can be reduced, or the volume of the used radiation curing resin can be reduced.

In the first coating step, the drop volume of the resin is the same as the volume of the resin in the second coating step. However, in the first step, a higher drop volume of the resin can be used compared to that of the resin in the second step. In this situation, minute foreign substances on the substrate can be more effectively removed to the outside of the substrate.

Hereinabove, this embodiment of the present invention is explained by examples. Note that, the invention is not limited to the above-mentioned embodiment, and it is also possible to apply the present invention to other embodiments based on the technical idea of the present invention.

Modification 1 of Embodiment 1

Hereinafter, an example of a modification of Embodiment 1 of the method of manufacturing an optical information recording medium of the present invention will be explained. Note that, for descriptions which correspond to Embodiment 1, overlapping explanations will be omitted.

In the example of Embodiment 1, all of the first coating step, the second coating step and the curing step are performed on the same rotating table. On the contrary, the uniform light-transmitting layer can be formed even if the curing step is performed on another rotating table as an independent process. Therefore, it is possible to perform each step on different rotating tables and to add a transfer step of the substrate between each step. With another rotating table, the manufacturing time can also be reduced.

The transfer method is preferably devised so as not to cause flow of the radiation curing resin coated on the substrate during the transfer.

Hereinabove, this embodiment of the present invention is explained by examples. Note that, the invention is not limited to the above-mentioned embodiment, and it is also possible to apply the present invention to other embodiments according to the technical idea of the present invention.

Modification 2 of Embodiment 1

Hereinafter, another example of a modification of Embodiment 1 of the method of manufacturing an optical information recording medium of the present invention will be explained. Note that, for descriptions which correspond to Embodiment 1 and Modification 1, overlapping explanations will be omitted.

Figure 8:
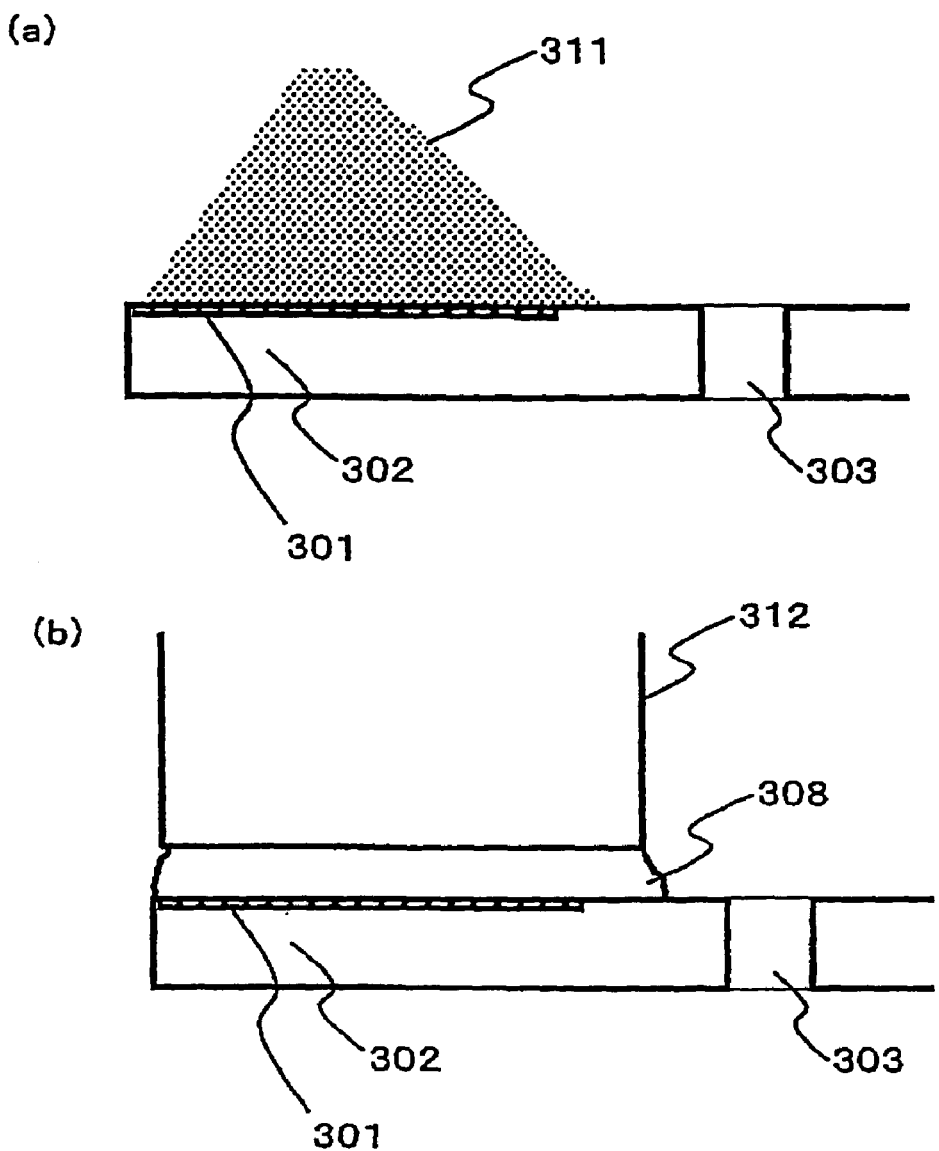
FIG. 8 is cross-sectional diagrams showing examples of a method of manufacturing an optical information recording medium of Modification 2 of Embodiment 1 of the present invention.

In Embodiment 1, the spreading of the first coating step is performed by spin coating, and the thin film made of the radiation curing resin is formed on the substrate and the signal recording layer. However, as mentioned in Embodiment 1, the object of the first coating step is to form a thin-film of a radiation curing resin on the substrate and the signal recording layer, in order to make the spreading of the resin during the second coating step easy. Thus, in the first coating step, the spin coating may not be used. For example, as shown in FIG. 8(a), a radiation curing resin 311 can be sprayed, or as shown in FIG. 8(b), a radiation curing resin 308 can be coated by a slit nozzle 312. Methods which can bring the following effects are preferably chosen: enabling the forming of a thin film in as short a time as possible; and using as small a volume of radiation curing resin as possible.

Hereinabove, this embodiment of the present invention is explained by examples. Note that, the invention is not limited to the above-mentioned embodiment, and it is also possible to apply the present invention to other embodiments according to the technical idea of the present invention.

Embodiment 2

Hereinafter, an example of the method of manufacturing an optical information recording medium of the present invention will be explained. Note that, for descriptions which correspond to Embodiment 1, Modification 1 and 2, overlapping explanations may be omitted.

As the method of manufacturing an optical information recording medium described above, when the light-transmitting layer is formed using a radiation curing resin, warp may occur on the medium due to curing contraction of the radiation curing resin. In order to reduce the warp, the radiation curing resin is set to be soft after the curing, for example, a pencil hardness of HB or B. In this situation, however, the light-transmitting layer may be too soft, so the surface of the layer can easily be scratched when handling the optical information recording medium, and the recording/reproducing properties may deteriorate.

Figure 9:
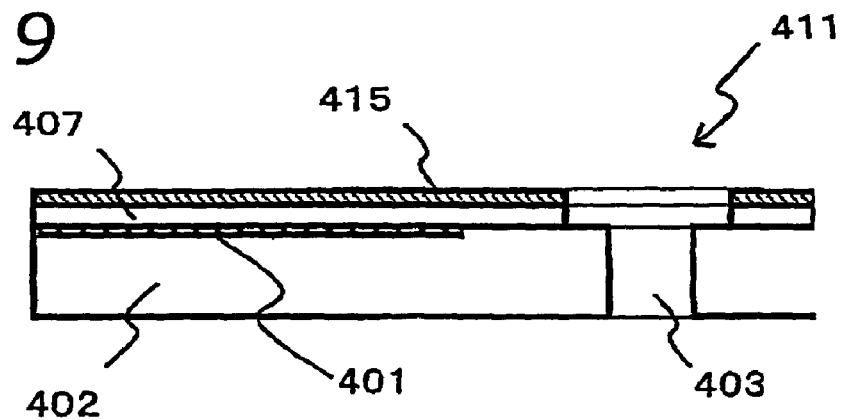
FIG. 9 is cross-sectional diagrams showing examples of a method of manufacturing an optical information recording medium of Embodiment 2 of the present invention.

Therefore, for the information recording medium 411 shown in FIG. 9, a protection layer 415 is preferably formed on a light-transmitting layer 407. The hardness of the protection layer 415 is preferably pencil hardness of H or more so as to decrease scratch resistance. The protection layer 415 may be formed by coating the radiation curing resin by spin coating or the like, and then by curing the radiation curing resin.

Here, the pencil hardness is determined by placing a sharpened pencil against the surface with a weight of 1 kg at an angle of 45 degrees, pulling the pencil under these conditions, and determining whether the surface is scratched or not. The pencil hardness is measured in accordance with JIS-K5400.

Hereinabove, the embodiment of the present invention is explained by examples. Note that, the invention is not limited to the above-mentioned embodiment, and it is also possible to apply the present invention to other embodiments according to the technical idea of the present invention.

Embodiment 3

Hereinafter, an example of the method of manufacturing an optical information recording medium of the present invention will be explained. Note that, for descriptions which correspond to Embodiment 1, Modification 1 and 2, and Embodiment 2, overlapping explanations may be omitted.

In the embodiments mentioned above, an optical information recording medium having only one signal recording layer, a so-called a single-layer typed medium, has been described. On the other hand, the present invention is also effective for an optical information recording medium having two or more signal recording layers, so-called a multiple-layer typed medium.

For example, as shown in FIG. 10(a), a two-layered optical information recording medium 511 has an intermediate layer 532 with a thickness of approximately 25 μm between a signal recording layer 501 and 531; and has a light-transmitting layer 507 with a thickness of approximately 75 μm. In addition, as shown in FIG. 10(b), a four-layered optical information recording medium 521 has intermediate layers 532, 542 and 552 of approximately 15 μm between each of signal recording layers 501, 531, 541 and 551, and has a light-transmitting layer 507 with a thickness of approximately 55 μM.

According to the required thickness of the manufactured light-transmitting layer, it is preferable to change the coating conditions or viscosity of the radiation curing resin.

Needless to say, to form the protection layer described in Embodiment 4 is also effective.

In addition, the above-mentioned multiple-layered optical information recording medium can be a recording/reproducing type disc which is rewritable, a write-once type disc which can record only once and a read-only type optical disc having Al or Ag as main components in the reflective layer.

Hereinabove, this embodiment of the present invention is explained by examples. Note that, the invention is not limited to the above-mentioned embodiment, and it is also possible to apply the present invention to other embodiments based on the technical idea of the present invention.

A method of manufacturing an optical information recording medium of the present invention is useful to reduce manufacturing time and volume of used liquid material and the like, when producing a light-transmitting layer made of liquid materials such as a radiation curing resin.

What is claimed is:

1. A method of manufacturing an optical information recording medium having a substrate which includes a center hole, at least one signal recording layer, and a light-transmitting layer formed from a radiation curing resin formed on the substrate, the method comprising:

forming a liquid state foundation by coating a radiation curing resin while rotating the substrate;

coating additional radiation curing resin on the liquid state foundation while rotating the substrate;

curing at least the additional radiation curing resin after said coating, wherein a maximum rotation speed of the substrate in said forming is greater than a maximum rotation speed in said coating, placing a cap at the center hole during said forming and said coating, the cap having a cap portion covering the center hole and a shaft extending vertically upward from the center of the cap portion, and pointing a nozzle at the center hole inclining against the vertical downward direction in the range between 5 degrees and 45 degrees during said coating such that the additional radiation curing resin is dropped onto the cap portion of the cap without contacting the shaft of the cap, so that the at least one of the radiation curing resin and the additional radiation curing resin does not adhere to the shaft of the cap, wherein the radiation curing resin is dropped at a first position and the additional radiation curing resin is dropped at a second position, the first and second positions being different from each other.

2. The method of manufacturing an optical information recording medium of claim 1, wherein said curing includes applying radiation while rotating the substrate.

3. The method of manufacturing an optical information recording medium of claim 1, wherein a rotation time of the substrate in said forming is shorter than a rotation time in said coating.

4. The method of manufacturing an optical information recording medium of claim 1, wherein a thickness of the light-transmitting layer is approximately 300 µm or less.

5. The method of manufacturing an optical information recording medium of claim 1, wherein the light-transmitting layer substantially transmits a recording/reproducing light.

6. The method of manufacturing an optical information recording medium of claim 1, further comprising:

transferring the substrate between said forming and said coating.

7. The method of manufacturing an optical information recording medium of claim 1, further comprising:

transferring the substrate between said coating and said curing.

8. The method of manufacturing an optical information recording medium of claim 1, wherein the liquid state foundation is thinner than the light-transmitting layer.

9. The method of manufacturing an optical information recording medium of claim 1, wherein the volume of the radiation curing resin dropped during said forming approximately equals or is greater than the volume of the additional radiation curing resin dropped during said coating.

10. The method of manufacturing an optical information recording medium of claim 1, further comprising:

forming a protection layer on the light-transmitting layer.

11. The method of manufacturing an optical information recording medium of claim 10, wherein the protection layer has a pencil hardness of H or more.

* * * * *